United States Patent
Kosco

(10) Patent No.: US 6,833,018 B1
(45) Date of Patent: Dec. 21, 2004

(54) POWDER METAL MATERIALS INCLUDING GLASS

(75) Inventor: John C. Kosco, St. Marys, PA (US)

(73) Assignee: Keystone Investment Corporation, Wilmington, DE (US)

( * ) Notice: Subject to any disclaimer, the term of this patent is extended or adjusted under 35 U.S.C. 154(b) by 0 days.

(21) Appl. No.: 10/144,605

(22) Filed: May 13, 2002

(51) Int. Cl.[7] .............................. B22F 1/00; B22F 3/00
(52) U.S. Cl. ........................... 75/230; 75/231; 75/246; 75/252; 419/10; 419/27
(58) Field of Search ................ 419/10, 27, 2, 419/11, 38; 75/230, 231, 246, 252, 243

(56) References Cited

U.S. PATENT DOCUMENTS

| | | | |
|---|---|---|---|
| 3,167,427 A | | 1/1965 | Slayter |
| 3,205,566 A | | 9/1965 | Breyton |
| 3,624,007 A | * | 11/1971 | Meyer .................. 252/513 |
| 3,844,800 A | * | 10/1974 | Hooton ................. 75/233 |
| 3,883,314 A | * | 5/1975 | Schnyder et al. ........ 75/231 |
| 3,891,399 A | * | 6/1975 | Cadle ................... 75/232 |
| 3,893,848 A | * | 7/1975 | Motoyoshi ............. 75/234 |
| 3,925,065 A | | 12/1975 | Osawa et al. |
| 4,182,437 A | * | 1/1980 | Roberts et al. ......... 188/251 A |
| 4,214,905 A | * | 7/1980 | Sliney .................. 419/54 |
| 4,715,892 A | * | 12/1987 | Mahulikar .............. 75/233 |
| 5,545,249 A | | 8/1996 | Tanaka et al. |
| 5,679,909 A | | 10/1997 | Kaneko et al. |
| 5,909,881 A | * | 6/1999 | Segawa ................. 277/627 |
| 6,110,268 A | * | 8/2000 | Gross et al. ............ 106/36 |
| 6,110,420 A | | 8/2000 | Moorhead et al. |
| 2003/0110888 A1 | | 6/2003 | Kosco |

OTHER PUBLICATIONS

Abubakir, S. et al. "Study on the Corrosion and Mechanical Properties of F5316 Stainless Steel–Glass Composite", *Acta Metallurgica Sinica* (*English Letters*), vol. II, No. 3 pp. 175–182 (Jun. 1998).

* cited by examiner

*Primary Examiner*—Ngoclan T. Mai
(74) *Attorney, Agent, or Firm*—Kirkpatrick & Lockhart LLP

(57) ABSTRACT

A method of forming a powder metal material includes molding a compact from a powder mix comprising an iron-containing powder and glass, and subsequently sintering the compact. Also disclosed is a sintered powder metal material including iron and glass.

76 Claims, 3 Drawing Sheets

POWDER METAL MATERIALS INCLUDING GLASS

The present invention is directed to powder metallurgical methods for producing materials including iron. More particularly, the present invention is directed to methods for producing materials including iron wherein all or a portion of a powder mix is molded and subsequently sintered.

The powder metal industry can trace its beginnings back to the development of the porous bronze bearing. In the early 1900's, the emergence of small electrical motors created a market for a low-cost, efficient bearing material. It was found that if one blended copper and tin powders in about a 90:10 ratio, molded the mixture, and sintered the resulting compact in a protective atmosphere at 1500–1550° F. (816–843° C.), the product was a porous bronze alloy. This porous sintered compact could then be impregnated with oil to give an excellent bearing material, which was essentially self-lubricating and served for the life of the motor without further oiling.

Porous bronze and variations of it dominated the porous bearing market until the introduction of porous iron-graphite powder metal materials in the 1970's. A motivation for development of an iron-graphite material was that the costs of iron and graphite powders were significantly lower than copper and tin powders.

An advantage of iron-graphite material produced by powder metallurgy techniques is that graphite particles in the material reduce friction between the material and supported moving parts. A problem encountered in producing iron-graphite bearings by powder metallurgy techniques, however, is the tendency for carbon to go into solution in iron at high temperatures. When this happens, hard phases (including pearlite and carbides) form in the iron-graphite material, which are abrasive and result in poorer bearing performance.

Early efforts to control the solution of graphitic carbon centered on the choice of graphite, the use of large particle size graphite, and the use of sulfur-containing iron powders. In addition, it was considered important to very closely monitor temperature while producing iron-graphite material to keep it below about 1900° F. (1037° C.) to inhibit solution of carbon. Even with tight temperature control, however, carbon solution may be a problem. Moreover, temperature control can reduce the strength of the bearing. If a typical conventional iron-graphite powder metal compact is sintered at less than about 1700° F. (927° C.), carbon absorption is inhibited, but part strength will be lower; on the other hand, if the part is sintered above about 1800° F. (982° C.), strength improves but problematic carbon solution increases.

Another approach to reducing the formation of carbides and other hard phases in sintered iron-containing powder metal bearing materials is to reduce or entirely eliminate graphite from the materials. Doing so with conventional iron-graphite powder mixes, however, may reduce the lubricity of the materials and their suitability for bearing applications.

Accordingly, a need exists for an improved method for producing iron-containing material by powder metallurgy techniques that may be used to produce bearing materials, as well as materials for other applications.

In order to address the above need, one aspect of the present invention is directed to a method of forming a powder metal material wherein the method includes molding a compact from a powder mix including at least one iron-containing powder and at least one glass, and subsequently sintering the compact. (As used herein, "including" means that other unspecified materials may be present. Also as used herein, "subsequently" means occurring later in time than, but not necessarily immediately after, a prior event or act.) In certain embodiments, the powder mix also includes at least one solid lubricant such as, for example, graphite or molybdenum disulfide. Materials made by the method of the present invention also are included within the present invention.

According to another aspect of the present invention, there is provided a powder metal material including iron and glass. Certain embodiments of the material also include at least one solid lubricant such as, for example, graphite or molybdenum disulfide.

According to yet another aspect of the present invention, there are provided articles of manufacture including materials within the present invention and/or which are made by a method within the present invention.

Yet another aspect of the invention is directed to methods for producing articles of manufacture, and which methods include the molding a compact from a powder mix including at least one iron-containing powder and at least one glass, and subsequently sintering the compact. In certain embodiments, the powder mix also includes at least one solid lubricant such as, for example, graphite or molybdenum disulfide.

The reader will appreciate the foregoing details of the present invention, as well as others, upon considering the following description of certain embodiments of the invention. The reader also may comprehend additional advantages of the present invention upon carrying out or using the invention. It will be understood that the following description necessarily is limited to only certain embodiments of the invention and is not exhaustive of the full range of embodiments of the invention.

The features and advantages of the present invention may be better understood by reference to the accompanying figures in which.

DESCRIPTION OF CERTAIN EMBODIMENTS OF THE INVENTION

Figure 1:
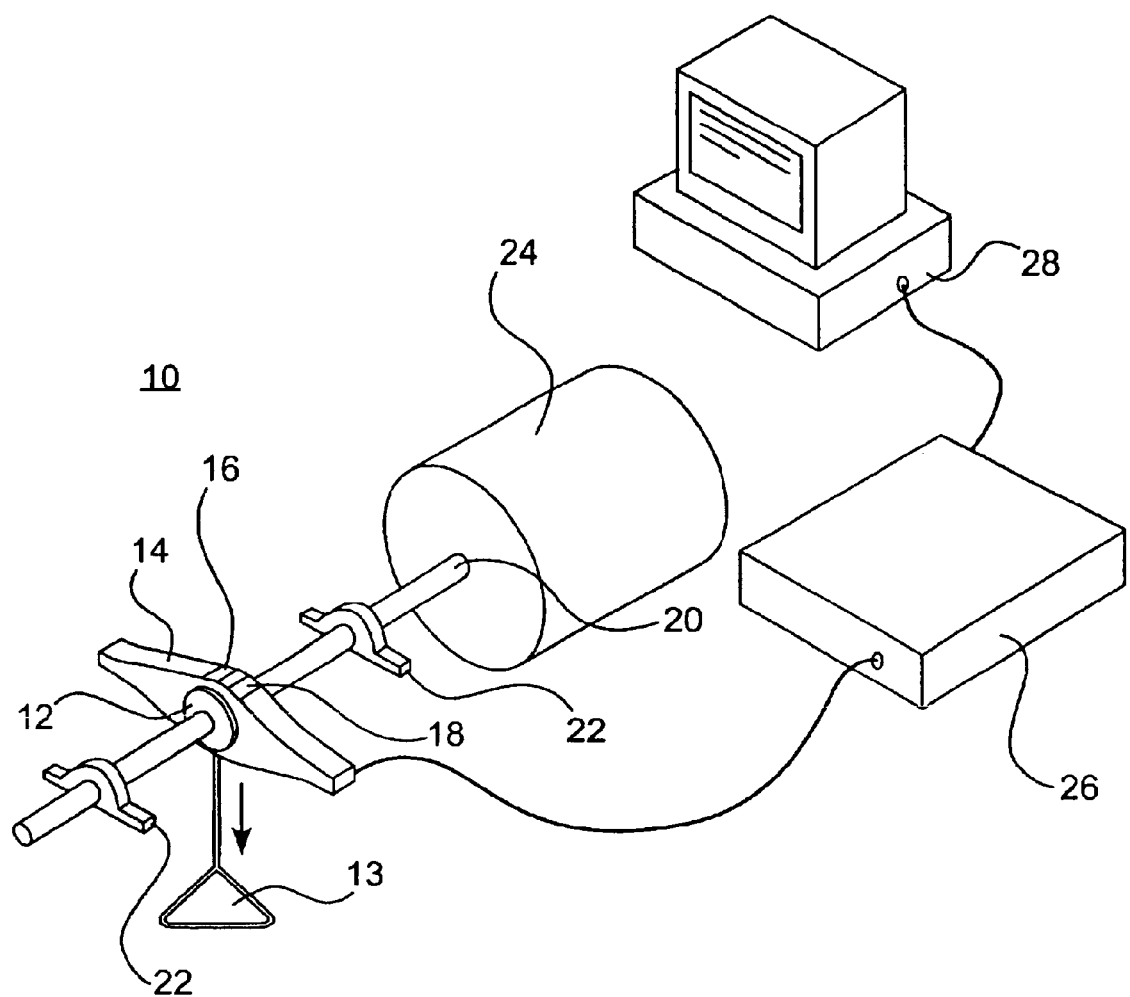
FIG. 1 is a schematic representation of a "torque tester" apparatus for evaluating the performance of powder metal bearings.

One aspect of the present invention is directed to a method for producing powder metal materials including iron and glass. Another aspect of the present invention is directed to powder metal materials and articles of manufacture made by a method including the method of the present invention. Yet another aspect of the present invention is directed to powder metal materials including iron and glass.

Iron-containing powder metal materials that may be produced by the method of the present invention include, but are not limited to, materials having glass and particulate graphite therein (referred to herein as "iron-graphite-glass materials"). Such materials may be made so as to include significant internal porosity, i.e., greater than 15 percent internal porosity by volume. Certain embodiments of such porous iron-graphite-glass materials may be particularly useful in bearing applications, such as those embodiments including 18–25 percent internal porosity by volume. Particulate graphite in such materials is exposed at the materials' bearing surfaces as the material wears, reducing friction experienced between the materials and parts contacting the materials. If desired, a liquid lubricant, such as oil, may be infiltrated into porosity provided in certain of such porous iron-graphite-glass materials after the materials have been formed into bearing parts. During the service life of parts made in this way, liquid lubricant within the parts' pores migrates to the parts' surfaces and complements anti-friction properties provided by the dispersed particulate graphite within the parts.

It will be understood that the present invention is not limited to porous iron-containing powder metal materials or to iron-graphite-glass materials. For example, one or more other solid lubricants, such as one or more of molybdenum disulfide, tungsten disulfide, and lithium carbonate, may be used in place of or along with any graphite in the materials. Other embodiments may lack graphite, molybdenum disulfide, or other solid lubricants. Moreover, other embodiments may lack significant internal porosity, such as, for example, parts intended primarily for structural applications.

A feature of the method of the present invention is the use of glass in a powder mix that also includes at least one iron-containing powder and may include other ingredients. In embodiments of the method, the powder mix is prepared in a substantially homogenous form. All or portions of the powder mix subsequently are compacted and sintered. Additional processing techniques also may be employed, and certain of those techniques are discussed below.

The one or more iron-containing powders included in the powder mix may be any particulate iron-containing materials useful for producing powder metal materials. As an example only, the powder mix may include one or more of the following: a pure sponge iron powder, a sponge-type iron alloy powder, an iron-containing sponge-type powder, an atomized iron powder, an atomized iron alloy powder, and an atomized alloy steel powder. It will be understood that "iron-containing powder" as used herein includes materials that include some minor or major amount of iron, and also includes materials wholly or substantially of iron.

In certain embodiments of the present invention, the iron-containing powder includes at least one pure sponge-type iron powder. Non-limiting examples of possible sponge iron powders include: Hoeganaes Corp. (Riverton, N.J.) grade MH100 powder; North American Hoganas (Johnstown, Pennsylvania) grade NC100 powders (99+ percent iron); and Domfer (Montreal, Canada) grade MP39 powder. Non-limiting examples of atomized iron powders that may be used in certain embodiments of the present invention include the following powders having impurity levels less than about 0.5 percent by weight: Hoeganaes grade A1000 and B1000 powders; North American Hoganas grade AHC and AHS powders; and Quebec Metal Powders (Montreal, Quebec) grade 1001 powder. Non-limiting examples of atomized alloy steel powders that may be used in certain embodiments in the powder mix of the present invention include: Hoeganaes grade A2000, 4600V, and 85HP powders; Quebec Metal Powders grade 4201, 4401, and 4601 powders; and North American Hoganas ASTALLOY A and CrM powders. Nominal compositions of A2000 and 4201 powders include, in weight percentages, 0.6 nickel, 0.6 molybdenum, and balance iron and incidental impurities. Nominal compositions of 85HP and 4401 powders include 0.85 molybdenum and balance iron and incidental impurities. Nominal compositions of 4600V, 4601, and ASTALLOY A powders include, in weight percentages, 1.8 nickel, 0.6 molybdenum, and balance iron and incidental impurities. The nominal composition of ASTALLOY CrM powder includes, in weight percentages, 3 chromium, 0.5 molybdenum, and balance iron and incidental impurities. Those of ordinary skill in the art may readily identify other iron-containing powders useful in the present invention. It will be understood that any of the iron-containing powders and other powder mix ingredients described herein in connection with the present description of certain embodiments of the invention, including those referred to herein as "pure", may include unavoidable or incidental impurities.

In certain embodiments of the method, the powder mix includes a minor amount, such as up to about 25 weight percent, of atomized (i.e., non-sponge) iron or iron alloy powder. However, such an additive need not be included or may be used in only relatively small amounts when fabricating parts for conventional bearing applications. If, however, the parts are intended for structural applications that would benefit from the presence of a solid lubricant in the material, or if it is desirable to provide a material having strength necessary for structural applications as well as enhanced machining properties, some amount of, for example, atomized iron powder, atomized iron alloy powder, or atomized steel powder may be included in the powder mix. If the parts are intended for certain high performance structural applications, a powder mix including pure atomized iron powder and particulate glass, as well as other possible ingredients such as, for example, graphite, molybdenum disulfide, binder, and lubricant, might be used, although such mix is provided by way of example only. The higher mechanical properties desirable in structural materials (relative to bearing materials) also may require processing the compacts by additional, known post-sinter techniques, such as, for example, hot forming or double-press/double-sinter techniques. Those with ordinary skill may determine without undue effort such additional processing conditions based on, for example, the intended application of the final parts.

Certain materials of the present invention may be formed from a powder mix including graphite. If graphite is included in the powder mix, it may be included in an amount of, for example, up to about 8, or about 2 up to about 6, weight percent. The graphite may be of any type and particle size considered suitable to form the final material, which in particular embodiments will include graphite particles as solid inclusions. Non-limiting examples of possible graphite grades for bearing applications include Superior Carbon (Chicago, Ill.) grade 4735 graphite, Applied Carbon (Somerville, N.J.) grade F103 graphite, or an equivalent graphite, which may have at least about 95–97 weight percent carbon and balance substantially ash. An example of a graphite type that may be used in the powder mix is flake-type graphite with about 99 weight percent passing through a 325 mesh screen. Again, it will be understood that such materials are discussed herein by way of example only, and those of ordinary skill may readily identify alternate materials.

Certain embodiments of the powder mix include up to about 15 weight percent of particulate glass. In certain embodiments, the powder mix includes about 0.5 up to about 15 weight percent glass. The powder mix may include one or a number of different glasses and, in the latter case, in certain embodiments of the powder mix the sum of the weights of the two or more glasses falls within about 0.5 about 15 weight percent range. Using less than about 0.5 weight percent glass may produce relatively little enhancement in performance or strength when certain materials made by the method are used in bearing applications. At high glass contents, greater than about 15 weight percent, slumping and melting is possible, and that may degrade frictional properties of the material. Certain other embodiments of the powder mix may include about 0.5 up to about 10 weight percent glass, or about 0.5 up to about 5 weight percent glass.

In embodiments of the present invention, the glass is provided in the powder mix in a powder (i.e., particulate) form to facilitate homogenous mixing with the iron-containing powder(s) and any other powder mix ingredients. In certain embodiments of the method, substantially all of the glass particles pass through a 100 mesh screen, while it also may be the case that greater than 50 weight percent of the particles pass through a 325 mesh screen. However, such particle size limitations are offered by way of example only.

Standard iron powders used in powder metal processing are substantially −80 mesh, with about 20–30 weight percent −325 mesh. If additional particulate ingredients in the powder mix are significantly different in particle size, there may be an increased tendency for the ingredients to separate. Also, if substantially more than about 30 weight percent of −325 mesh particles are present, problems with flow of the powder mix into a molding die may occur. However, these observations are in no way intended to limit the scope of the present invention, and the powder mixes used in the present method are not limited to those meeting these limitations.

By way of example only, in certain embodiments the glass in the powder mix has a melting point less than about 1700° F. (927° C.), and in certain embodiments the glass melting point is less than about 1500° F. (816° C.). As used herein, the "melting point" of a glass (which is a super-cooled liquid rather than a crystalline material) is the temperature at which the viscosity of the material is approximately 100 centipoise. Reference herein to glass that has "melted" or that is a "liquid" is to glass heated to or above its melting point.

It is believed that the strength of materials within the present invention may be enhanced if glasses in the powder mix favorably wet the iron-containing powders in sintered compacts formed from the powder mix. Wetting is "favorable" when the glass coats the iron-containing powders with a glass layer in sintered compacts of the material. The layer may be, for example, a thin and relatively uniform glass layer. If wetting is poor between a glass and an iron-containing powder, the glass may consolidate into small balls and migrate to the surface of the sintered compact so as to minimize contact with the iron-containing powder. This can reduce the strength of the final part. Strength may be improved if glasses within the powder mix favorably wet any graphite, molybdenum disulfide, or other solid lubricant particles in sintered compacts formed from the powder mix. These observations are in no way intended to limit the scope of the present invention, and materials within the present invention are not limited to those in which favorable wetting is manifested.

Examples of glasses believed useful in one or more embodiments of the present invention include the following glasses available from Ferro Corp., Cleveland, Ohio: Ferro XF140 phosphate glass (1100° F. (593° C.) approx. melting point); Ferro XL135 high sodium glass (1300° F. (704° C.) approx. melting point); Ferro XG677 acid resistant glass (1400° F. (760° C.) approx. melting point); and XL146 high sodium glass. Based on observations of the inventor, certain glasses with melting points less than 1500° F. (816° C.) that are useful in embodiments of the present invention include, by weight, 30–60 percent $P_2O_5$ and/or up to 50 percent boric oxide and/or 10–25% alkalis, $K_2O$, and $Na_2O$, with the balance commonly $SiO_2$. It will be understood that any glass may be used in the present invention that provides a powder metal material upon processing having properties suitable for the material's intended application. Thus, the above list of possible glasses is provided by way of example only and should not be considered to limit the scope of the invention. Those having ordinary skill in the art may readily identify alternative glasses useful in the present invention.

Those of ordinary skill, on reading the present description of the invention, will understand that numerous additional metal-containing and metal-free additives known in the art may be included in the powder mix. For example, the powder mix may include one or more powdered alloying additions such as, for example, tin, copper, molybdenum, and/or nickel powders. The particular alloying additions used, if present, would necessarily depend on the desired properties of the material, and those of ordinary skill would be able to determine what type and amount of alloying additions may be appropriate based on the properties desired.

Molybdenum disulfide is one ingredient that may be included in the powder mix. In certain embodiments of the present invention, molybdenum disulfide is present in amounts up to about 6 weight percent of the powder mix. Molybdenum disulfide is a solid lubricant that survives typical sintering temperatures and may contribute to friction reduction and wear resistance during the service life of the iron-containing part. One example of a suitable molybdenum disulfide product is SURFCOAT 6, available from Hohman, (Bridgeville, Pa.). Those having ordinary skill may readily identify other suitable commercially available molybdenum disulfide products.

Those having ordinary skill may readily ascertain the possible identities and useful amounts of other solid lubricants that may be included in the powder mix. As such, further disclosure of such other possible solid lubricants is not provided herein.

Organic compounds also may be present in the powder mix in the form of lubricants and/or binders. Powder lubricants may reduce friction, promote even distribution of the powder mix ingredients during compaction, and allow for easy ejection from the die after molding. Typical lubricants that may be present in the powder mix include: stearic acid (available from, for example, Witco. Corp., Petrolia, Pa.); ethylene-bis stearamide or "EBS" (such as, for example, ACRAWAX C, available from Lonza Corp.); and zinc stearate. Binders may help to agglomerate the powder particles during mixing and promote homogeneity in the powder mix. Binders also may improve green strength after molding so that the compact may be handled prior to sintering without breakage. Binders that may be included in the powder mix are, for example, polyethylenes, acrylics, polystyrenes, polyamides, polyvinyl alcohols, phenolics, cellulosics, and agar. It will be understood that in certain cases ingredients to the powder mix are non-particulate materials. However, in a typical process for producing powder metal parts the powder mix is processed to a generally homogenous particulate form before molding.

In general, the weight percentages of ingredients (including glass, iron and any molybdenum disulfide) in the powder mix will be substantially maintained in the final part. An exception is percentage carbon (graphite), which may be reduced during processing through a phenomenon known as "hydrogen loss". This can result through reduction of the oxide films on iron-containing powder particles during sintering of compacts including such powder particles. Reduction can occur by the atmosphere in the sintering oven or by graphite added to the powder mix. When the reduction reaction occurs, the oxygen is driven off as a gaseous reduction product, e.g., $CO_2$ or $H_2O$, and the compact loses weight. Sponge-type iron powders typically have thicker oxide films than atomized iron powders, so weight losses with compacts predominantly of sponge-type iron powders typically can vary from about 0.1 to about 1.2 weight percent. Atomized powders typically lose only about 0.1 percent weight due to hydrogen loss. It is believed that with typical processing conditions, the carbon weight percentage of the sintered compact is within +/−0.35 percent of the powder mix carbon weight percentage, if any.

Any suitable process for making the powder mix can be used in the present invention. The step of mixing the ingredients to provide a powder mix may provide a mix in a substantially homogenous form.

After powder mix ingredients are blended, the blend may then be discharged from the mixing apparatus and, optionally, screened to remove oversized particles. Screening also may better assure a uniform particle size range in order to promote uniform and consistent filling of the mold or die cavity.

All or a portion of the powder mix may be compacted using conventional techniques to provide a green compact of the desired shape and dimensions. By way of example only, all or a portion of the powder mix may be placed in a die having the desired shape and dimensions and pressed. Typical molding pressures lie in the range of about 12 tsi to about 70 tsi, while a range of about 12 tsi to about 40 tsi may better limit die wear. However, other molding pressures may be used. In the case where the compact is to be infiltrated with oil or another liquid lubricant in a later step for use as a bearing part, the green compact may include significant porosity such as, for example, about 18 to about 25 volume percent porosity.

The resulting green compact may be sintered using conventional sintering equipment. As a non-limiting example, the compact may be sintered in a belt or batch sintering furnace providing an inert atmosphere such as endogas, dissociated ammonia, nitrogen gas, or a mix of nitrogen gas and 2–10 volume percent hydrogen gas. Other suitable sintering apparatus will be readily apparent to those of ordinary skill. Such practitioners also may determine suitable sintering temperatures and time-temperature profiles for a particular compact based on the desired strength, density, and other properties of the sintered compact. Thus, the following description of certain sintering temperatures should not be considered to limit the invention.

Typical sintering temperatures for iron-base powder metal compacts are in the range of 1900–2350° F. (1038–1288° C.). The present inventor has found through experimentation that parts can be made by certain embodiments of the method of the present invention using graphite-containing iron-glass powders and sintering temperatures in the range of about 1500° F. (816° C.) to about 1750° F. (954° C.) while still developing strengths in the sintered parts in excess of 10,000 psi, even when the parts include graphite at levels over 4.5 weight percent. It will be understood, however, that such sintering temperature range is not provided as a limitation on the scope of the method of the present invention. It is believed that 1700° F. (927° C.) is generally the approximate temperature at which carbon solution in iron becomes significant when sintering graphite-containing iron-based powder metal parts. Because certain embodiments of the present method may produce parts having acceptable strength from graphite-containing powder mixes using sintering at temperatures as low as about 1500° F. (816° C.) to less than 1700° F. (927° C.), there may be a reduced tendency for carbon to go into solution in the iron relative to sintering at higher temperatures, and the tendency for formation of iron carbide and other hard and abrasive phases is reduced. Embodiments of the present method providing suitable part strength from graphite-containing powder mixes when using relatively low sintering temperatures also may facilitate the use of higher graphite, molybdenum disulfide, or other solid lubricant contents for additional solid lubrication.

Sintered compacts may be further processed using any known powder metal production technique such as, for example, hot forming, sizing, coining, or rolling. In one embodiment of the method, the sintered compacts are produced to include some porosity, which may be infiltrated with oil or another liquid lubricant to provide a self-lubricating bearing material. Other possible post-sinter techniques include an additional press and sinter treatment, or the post-sinter steps of the HFA™ alloy process described and claimed in U.S. Pat. No. 5,613,180, the entire disclosure of which is hereby incorporated herein by reference. When producing bearings, a post-sintering sizing step may be employed for dimensional control. If parts produced by embodiments of the present method are intended for some other application, such as for highly machinable, high strength structural parts, post-sintering steps such as hot forming may be used. In the latter case, it may be advantageous to use atomized iron or low-alloy steel powders in addition to or instead of sponge irons. Where high density and high strength structural parts are required, it is likely that oil impregnations would not be used. Materials within the present invention intended for high strength applications might be subjected to any of several known post-sinter surface and heat treatment techniques including, for example, quench-and-temper, induction hardening, surface densification, carburization, carbonitriding, and shot peening techniques.

It will be understood that the present invention also is directed to powder metal materials produced by the method of the present invention and to articles of manufacture including those materials. Representative articles of manufacture that may be fabricated from or include material produced by the present method include, for example, bearings, such as those of the oil-impregnated self-lubricating type.

To evaluate the present invention, various bearing parts were produced and tested on bearing testing machines. The results are discussed below. The testing machines used were a "torque tester", depicted schematically in FIG. 1, and an "edge-loaded tester", depicted schematically in FIGS. 2 and 3. The torque tester of FIG. 1 is generally designated as 10. A bearing 12 is inserted into housing 14. A weight, shown as element 13 hanging from housing 14, places a load on bearing 12 in the direction of the arrow. Thermocouple 16 and torque sensor 18 are mounted on housing 14 and measure, respectively, the temperature of bearing 12 and the torque experienced by bearing 12. The load on housing 14 may be adjusted to adjust the load on bearing 12. Shaft 20 passes through bearing 12 and is supported by pillow blocks. Motor 24 rotates shaft 20 at a selected rotational speed. The motor speed, bearing temperature, and torque experienced by the bearing are recorded over time by data acquisition unit 26, and the data may be analyzed using computer 28.

During testing using the torque tester, the rotational velocity and load to which the bearing is subjected are set to provide a predetermined pressure/velocity relationship. The torque and temperature of the bearing are monitored for a period of time and may be charted throughout the test. The normal load carrying capacity of bearings may be represented as a "PV" factor, which is calculated by multiplying pressure exerted on the bearing by the rotating shaft supported by the bearing and the velocity of the rotating shaft. PV factor is determined herein as the product of force in psi (lb/in$^2$) and velocity in feet/minute (ft/min), thereby resulting in units of lb.ft/in$^2$.min. PV factor, however, is typically provided as a unitless number and will be presented as such herein.

Figure 2:
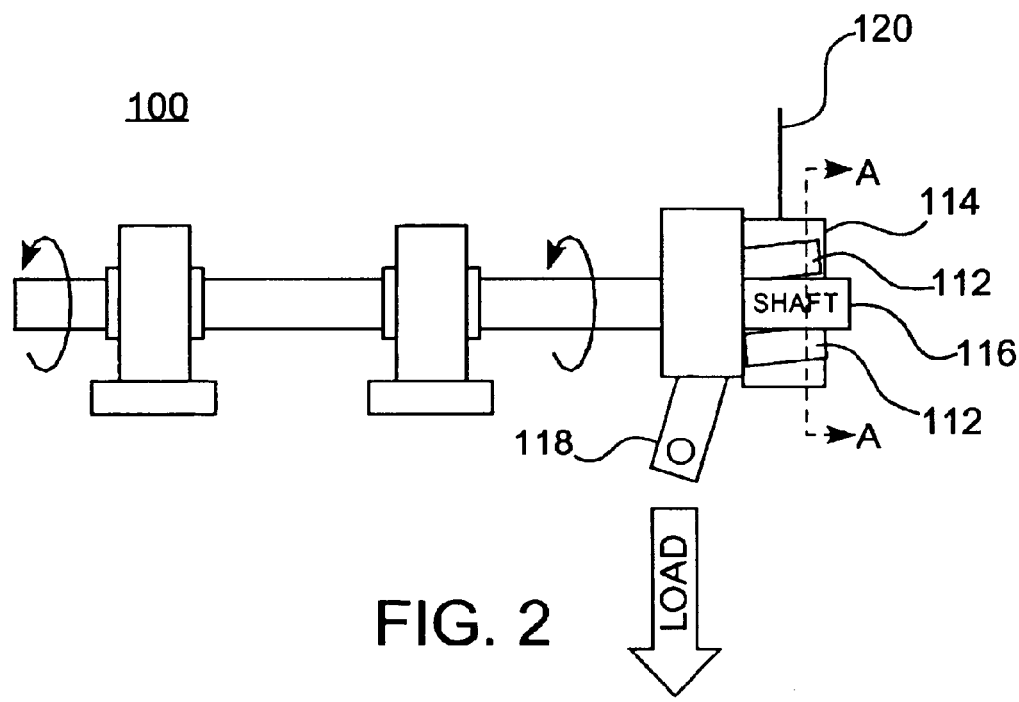
FIGS. 2 and 3 are schematic representations of an "edge-loaded tester" apparatus for evaluating the performance of powder metal bearings.
Figure 3:
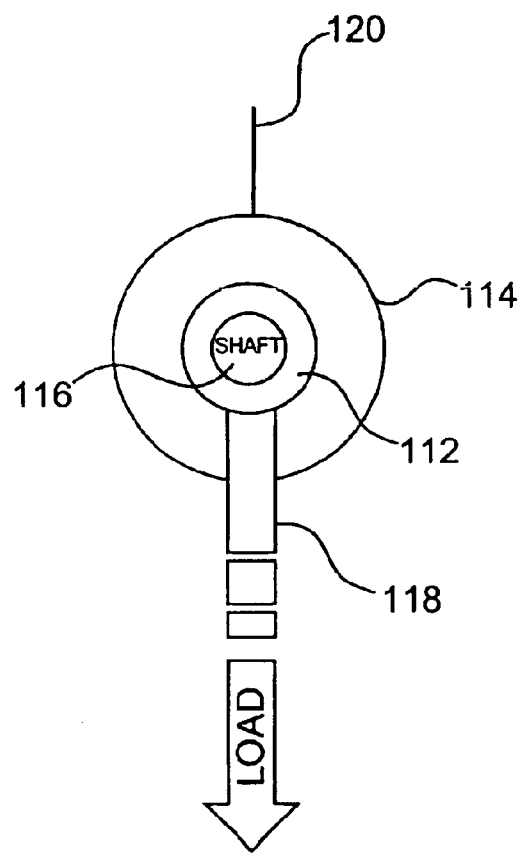

An edge-loaded tester is a device known in the art for evaluating bearing materials. The edge-load tester is schematically shown in FIGS. 2 and 3 and is generally designated as 100. FIG. 3 is a cross-section of FIG. 2 approximately at section A—A. The bearing 112 to be evaluated is pressed into a housing 114 and positioned on shaft 116. A load 118 is applied to obtain the desired PV value, and the load 118 is deliberately misaligned by 20 degrees to simulate a severe situation in an actual production bearing assembly. A thermocouple 120 is inserted into a hole drilled in the bearing 112 to monitor bearing temperature as a function of run time. The tests were run for approximately 60 minutes, and the maximum temperature ($T_{max}$) and final temperature ($T_{final}$) of the bearings were recorded. In general, temperature is an indicator of bearing performance. Higher temperatures tend to degrade lubricants, which causes the bearings to fail more readily. Therefore, low maximum and final bearing temperatures are generally more desirable.

In using the torque tester apparatus, it has been observed that an equilibrium bearing torque and an equilibrium bearing temperature usually are reached in less than 90 minutes of the beginning of testing with conventional oil-impregnated iron-graphite bearings. During such testing, conventional oil-impregnated iron-graphite bearings typically rapidly increase in temperature to a maximum temperature ($T_{max}$) of less than about 125° F. (51.7° C.), and then rapidly cool to an equilibrium operating temperature of about 100–115° F. (43.3–46.1° C.). Superior bearing performance is indicated by low maximum temperature, short time at $T_{max}$, low equilibrium temperature, and low static and dynamic torques.

During testing with the torque tester apparatus, bearing temperatures rose from start-up temperature and, after some time, reached a substantially constant equilibrium temperature. Lower equilibrium temperatures are generally desirable because they equate to lower energy losses, and also because oils degrade as temperature increases. The lower temperatures will reduce oil vapor losses and oil oxidation. A lower torque indicates lower frictional losses during running. The torque at time=0 may be referred to as the "start-up" torque, which is the torque required to start rotation of the shaft of the torque tester. The start-up torque is always the maximum torque. Once the shaft is rotating, the bearing material tends to heat up, and oil moves into the gap between the bearing and the rotating shaft when the bearings are of the oil-impregnated type. This further reduces the friction experienced between the shaft and the bearing. As testing proceeds, bearings typically reached a substantially constant equilibrium torque. Assuming other factors (such as strength, percentage porosity, and permeability) are essentially constant, lower torque values would be expected to produce generally improved bearing performance.

One embodiment of the present invention is directed to certain iron-containing powder metal materials that, when fashioned by certain embodiments of the method of the present invention as bearing parts including glass and at least one of up to about 8 weight percent graphite and up to about 6 weight percent molybdenum disulfide, have a lifetime of at least about 1000 hours on the edge-loaded tester when subjected to a rotating steel shaft at a PV factor of at least 50,000. As used herein, "lifetime" refers to that period of time before which bearing temperature climbs to greater than 200° F. (93.3° C.) under continuous running at room temperature in the edge-loaded test. More particularly, certain materials made by the method of the present invention have demonstrated lifetimes of at least 1000–5000 hours when tested at a PV factor of 100,000–132,000 on the edge-loaded tester using a 0.500 diameter steel shaft running at about 3500 rpm and in various modes of operation including continuous, forward/reverse, and on/off.

One particular embodiment of the method of the present invention includes forming a bearing material from a powder mix including at least one iron-containing powder, particulate graphite, molybdenum disulfide, and at least one suitable powdered glass having a melting point less than about 1700° F. (927° C.) or less than about 1500° F. (816° C.). The compact is then sintered at a temperature greater than the glass melting point temperature.

In certain embodiments of the method of the present invention, it appears that the presence of glass may help to consolidate and bind together the powder particles, allowing the use of lower sintering temperatures to form sintered compacts of acceptable strength. In cases where it is possible to reduce sintering temperatures, the tendency for carbon to react with iron also is reduced. This promotes maintaining the iron in its soft ferrite phase, which is generally advantageous in bearing materials. Thus, sintered materials formed by certain embodiments of the method of the present invention from a blend of sponge iron powder, particulate graphite, particulate molybdenum disulfide, and glass were characterized by a soft ferritic iron matrix with a random dispersion of particles of graphite and molybdenum disulfide throughout. A photomicrograph of one such material is provided as FIG. 4. In the photomicrograph, the glass is found primarily in the grain boundaries and the pores of the material and approximately 20 volume percent of the material is void space, which may be filled with oil or another liquid lubricant, if desired.

In the following Examples 1–5, powder mix ingredients (including iron, graphite and/or molybdenum disulphide, glass, and lubricant) were blended in a V-cone blender to assure good homogeneity. The iron powders used were selected from Hoeganaes MH100 sponge iron powder and North American Hoganas NC100 and AHC100 iron powders, which are composed of iron and less than 0.5 weight percent impurities. The graphite powders used in Examples 1–5 were selected from Applied Carbon grade F103 graphite powder (Applied Carbon, Summerville, N.J.) and Superior Carbon grade 4735 graphite powder. The molybdenum disulfide used in Examples 1–5 was SURF-COAT 6 (Hohman Plating, Dayton, Ohio). Materials formed from the powder mixes of Examples 1–5 were evaluated using the edge-loaded tester.

EXAMPLE 1

To provide a comparison of embodiments of examples of the material of the present invention with non-glass bearing material, the industry standard iron-graphite material, FG0303 (Metal Powder Industries Federation Standard 35 for self-lubricating bearings, p.11), was processed into bearing parts. FG0303 powder was obtained in press-ready condition from the powder supplier, ARC Metals, a division of Hoeganaes/GKN. The press-ready powder contained all components required to meet the MPIF FG0303 specifications. The powder was compacted to about 5.5 g/cc and sintered in the recommended temperature range at about 1900° F. (1038° C.). Parts were subsequently sized to about 5.7 g/cc to obtain parts with about 20 percent open porosity. Parts were then vacuum oil-impregnated prior to testing. The resulting bearing parts met the specifications required by MPIF Standard 35 for "P/M Self-Lubricating Bearings", *Iron and Iron-Carbon Bearings* (1998 edition), page 7. Specifically, the parts showed a minimum strength constant "K" equal to 15,000 psi (100 MPa), minimum oil content of 21 percent, less than 0.3% combined carbon and a wet (oiled) density of 5.6–6.0 g/cc. The FG0303 parts were run at PV of about 100,000 on the edge-load tester with results as in Table 1. All results in Table 1 are an average of five individual runs.

TABLE 1

| Example | $T_{max}$ (° C.) | $T_{final}$ (° C.) |
| --- | --- | --- |
| 1 | 141 | 127 |
| 2 | 71 | 69 |
| 3 | 75 | 68 |
| 4 | 99 | 67 |
| 5 | 88 | 84 |

EXAMPLE 2

A dry mix was prepared including 82 parts (by weight in all of the following examples unless otherwise noted) North American Hoganas NC100 sponge iron powder, 15 parts North American Hoganas AHC100 atomized iron powder, 2 parts Applied Carbon F103 graphite, 0.6 parts molybdenum disulphide, 2 parts Ferro XF140 phosphate glass, and 0.4 parts stearic acid. Analysis indicates that XF140 glass includes approximately 30 weight percent $P_2O_5$, 20 weight percent $Al_2O_3$, alkali, and balance $B_2O_3$ and other oxides. The glass had a melting point of about 1250° F. (677° C.) and was furnished as −150 mesh powder. A solution of Dupont ELVACITE 2010 acrylic resin in acetone was prepared by mixing 20 g of resin per liter of acetone. Wet mixes of the powder ingredients were then made by adding 20 cc of the solution per 100 g of powder blend with stirring. The resulting slurry was air dried with stirring until it reached the consistency of wet sand. It was then air dried overnight under a hood and screened through a 60 mesh screen prior to molding. Parts were molded from the resulting powder mix at about 15 tsi, and sintered in a 95% $N_2$-5% $H_2$ (by volume) atmosphere at 1650° F. (899° C.). The sintered parts were then sized to 5.6 g/cc. Parts were subsequently vacuum oil-impregnated with Exxon TERRESTIC 32 turbine oil and tested using the edge-loaded tester. Results are given in Table 1.

EXAMPLE 3

A powder mix was prepared including 82 parts North American Hoganas NC100 sponge iron powder, 15 parts North American Hoganas AHC 100 atomized iron powder, 2.8 parts Applied Carbon F103 graphite, 2 parts Ferro XF140 glass, and 0.3 parts stearic acid. An acrylic resin solution was prepared and added to the mix as in Example 2. The resulting slurry was dried, screened, and processed into sized and sintered parts as in Example 2. The parts were subsequently vacuum impregnated with oil as in that example. Results from testing of the parts using the edge-loaded tester are reported in Table 1.

EXAMPLE 4

A powder mix including 82 parts North American Hoganas NC100 iron powder, 15 parts North American Hoganas AHC100 atomized iron powder, 2.8 parts Applied Carbon F103 graphite, 2 parts Ferro XF140 glass, and 0.5 parts stearic acid was prepared by dry blending the powder ingredients in a V-cone blender for 20 minutes. Parts were molded from the powder mix, sintered, sized, and oil-impregnated as in Example 2. Test results using the edge-loaded tester are reported in Table 1.

EXAMPLE 5

A powder mix including 80 parts North American Hoganas NC100 iron powder, 15 parts North American Hoganas AHC100 atomized iron powder, 4.0 parts Applied Carbon F103 graphite powder, 2 parts Ferro XF140 glass, and 0.3 parts stearic acid was prepared using the method of Example 2. An acrylic resin solution was prepared and added to the mix as in Example 2. The resulting slurry was dried and screened as in Example 2. Parts were molded from the resulting powder mix to about 5.1 g/cc, sintered as in Example 2, and sized to about 5.3 g/cc to obtain about 20 percent porosity in the final part. Parts were subsequently vacuum oil-impregnated as in Example 2. Test results using the edge-loaded tester are reported in Table 1.

As shown in Table 1, all parts made from the glass-containing mixes of Examples 2–5 experienced significantly lower operating temperatures in the edge-loaded test than did the industry standard material, Example 1. The material of Example 4, which was made using dry mixing of the powder ingredients, exhibited a higher maximum bearing temperature than the materials of Examples 2, 3, and 5. However, the Example 4 material exhibited a lower maximum temperature than the standard material, remained at maximum temperature for less than 4 minutes, and had a final temperature that was substantially the same as that of Examples 2 and 3. The higher graphite mix of Example 5 ran at a higher bearing temperature than the 2.0–2.8 percent graphite compositions, but exhibited lower temperature than the industry standard material of Example 1.

EXAMPLE 6

A series of powder mixes including iron powder, particulate graphite, a binder, and lubricant was prepared. A second series of powder mixes was prepared in a similar manner except that various glass additions were made to the mixes. Molybdenum disulfide also was included in certain of the mixes. In each powder mix, the iron-containing powder was Hoeganaes MH100 sponge iron powder; the graphite was Applied Carbon F103; the molybdenum disulfide was Surfcoat 6; the lubricant was stearic acid at a 0.5 weight percent level relative to the weight of the entire mix; and the glass was Ferro XF140 phosphate glass. The iron powder, graphite, molybdenum disulfide, and glass contents of each powder mix are shown in Table 2 below.

Portions of each powder mix were molded at about 12 tsi to approximately 80 percent of theoretical full density. The molded compacts were sintered in a 97 parts nitrogen:3 parts hydrogen (by volume) atmosphere at various sintering temperatures in the range of 1600–1850° F. (871–1010° C.) for about 20 minutes. Transverse rupture strengths were measured by conventional methods with the results shown in Table 2. The addition of glass appeared to have a favorable effect on the transverse rupture strength of the samples.

TABLE 2

| Iron (wt. %) | Graph-ite (wt. %) | MoS$_2$ (wt. %) | Glass (wt. %) | Transverse Rupture Strength (psi) for Various Sintering Temperatures | | |
|---|---|---|---|---|---|---|
| | | | | 1600° F. (871° C.) | 1700° F. (927° C.) | 1850° F. (1010° C.) |
| 97.35 | 2.75 | — | — | 12500 | 14100 | 16700 |
| 97.35 | 2.75 | — | 2.0 | 16400 | 22100 | 27700 |
| 96.4 | 2.0 | 0.6 | — | 12300 | 15670 | 18740 |
| 96.4 | 2.0 | 0.6 | 2.0 | 12400 | 20151 | — |
| 95.5 | 4.5 | — | — | 8900 | 9000 | 9100 |
| 95.5 | 4.5 | — | 2.0 | — | 13300 | — |
| 95.5 | 4.5 | — | 4.0 | — | 14100 | — |

EXAMPLE 7

A powder mix was prepared including 77 parts North American Hoganas NC100 iron powder, 18 parts North American Hoganas AHC100 atomized iron powder, 2.4 parts Applied Carbon F103 graphite, 2 parts Ferro XF140 glass powder, 0.5 parts stearic acid, and 0.85 parts of binder. The mix was screened to 60 mesh. Portions of the mix were molded at about 15 tsi to 5.4 g/cc, and the compacts were then sintered in a nitrogen-3 percent hydrogen (by volume) atmosphere at 1600° F. (871° C.). The sintered parts were sized to about 5.6 g/cc and subsequently oil-impregnated with Exxon TERRESTIC 32 turbine oil. The finished parts were tested on the torque tester apparatus described above at 100,000 PV. Maximum and end temperatures and the starting and equilibrium torques experienced by the bearing during testing were monitored. Results are presented along with results from other examples in Table 3 below.

EXAMPLE 8

A powder mix was prepared including 77 parts North American Hoganas NC100 iron powder, 18 parts North American Hoganas AHC100 atomized iron powder, 2.4 parts Applied Graphite F103 graphite, 2 parts Ferro XL135 glass powder, 0.5 parts stearic acid, and 0.85 parts binder. The mix was screened, molded, sintered, sized, oil-impregnated, and tested as in Example 7. Results of testing on the torque tester are given in Table 3.

EXAMPLE 9

A powder mix was prepared including 77 parts North American Hoganas NC100 iron powder, 18 parts North American Hoganas AHC100 atomized iron powder, 2.4 parts Applied Graphite F103 graphite, 0.5 parts Ferro XF140 glass powder, 0.5 parts stearic acid, and 0.85 parts binder. The mix was screened, molded, sintered, sized, oil-impregnated, and tested as in Example 7. Results of testing on the torque tester are given in Table 3.

EXAMPLE 10

A powder mix was prepared including 76 parts North American Hoganas NC100 iron powder, 17 parts North American Hoganas AHC100 atomized iron powder, 1.0 parts Ferro XF140 glass powder, 4.1 parts Applied Carbon F103 graphite, 0.85 parts binder, and 0.5 parts stearic acid. The mix was screened, and portions of the powder mix were molded to about 5.2 g/cc to obtain approximately 20 volume percent porosity in the final part. Parts were sintered at 1700° F. (927° C.) and sized to 5.4 g/cc. Parts were subsequently oil-impregnated and tested as in Example 7, with the results shown in Table 3.

EXAMPLE 11

A powder mix was prepared including 74.5 parts North American Hoganas NC100 iron powder, 17 parts North American Hoganas AHC100 atomized iron powder, 5.5 parts Applied Carbon F103 graphite, 1.0 parts Ferro XF140 glass powder, 0.5 parts stearic acid, and 0.85 parts binder. To obtain a final porosity of about 20 volume percent, portions of the screened powder mix were molded to about 5.0 g/cc, sintered, and then sized to 5.2 g/cc. Compacts were sintered, oil-impregnated, and tested as in Example 7, with the results shown in Table 3.

TABLE 3

| Ex. | Iron (wt. %) | Graph. (wt. %) | Glass (wt. %) | Sized Hardness (RH) | Oil (%) | Kval. (ksi) | Max. Temp. (° F.) | Equil. Temp. (° F.) | Start Torque (oz-in) | End Torque (oz-in) |
|---|---|---|---|---|---|---|---|---|---|---|
| 7 | 95 | 2.4 | 2.0 | 75 | 20.5 | 19.7 | 101 | 98 | 13.2 | 3.9 |
| 8 | 95 | 2.4 | 2.0 | 73 | 19.6 | 23.3 | 109 | 101 | 7.8 | 5.2 |
| 9 | 95 | 2.4 | 0.5 | 70 | 22.0 | 22.0 | 125 | 115 | 20.5 | 9.4 |
| 10 | 93 | 4.1 | 1.0 | 66 | 21.4 | 17.6 | 102 | 100 | 7.5 | 6.7 |
| 11 | 91.5 | 5.5 | 1.0 | 71 | 21.6 | 10.5 | 111 | 106 | 13.0 | 6.3 |

EXAMPLE 12

A powder mix was prepared including 80 parts North American Hoganas NC100 sponge iron powder, 15 parts North American Hoganas AHC100 atomized iron powder, 5.4 parts Applied Carbon F103 graphite, 1.5 parts stearic acid, and 0.5 parts acrylic. Parts were molded at about 5.0 g/cc, sintered at about 1650° F. in a 95% N$_2$-5% H$_2$ (by volume) atmosphere, and sized to about 5.2 g/cc to obtain about 20 percent porosity in the final part. The parts were vacuum oil-impregnated as in Example 7 and evaluated using the torque tester described above at PV of about 100,000. The test results are reported in Table 4 below. All results in Table 4 are an average of five runs for each material.

EXAMPLE 13

A powder mix was prepared as in Example 12, except that 2 parts of Ferro XF140 glass powder was included in the powder mix. The mix was processed to oil-impregnated parts and tested as in Example 12. The test results using the torque tester are reported in Table 4.

EXAMPLE 14

A powder mix was prepared as in Example 12, except that 3 parts of Ferro XF140 glass powder was included in the mix. The powder mix was processed to oil-impregnated parts and tested as in Example 12. Test results are reported in Table 4.

EXAMPLE 15

A powder mix was prepared as in Example 12, except that 4 parts of Ferro XF140 glass powder was added to the powder mix. The mix was processed to oil-impregnated parts and tested as in Example 12. Test results are reported in Table 4.

TABLE 4

| Example | Equil. Torque (in-lb) | $T_{max}$ (° F.) | $T_{final}$ (° F.) |
| --- | --- | --- | --- |
| 12 | 6.9 | 115 | 108 |
| 13 | 6.3 | 111 | 106 |
| 14 | 5.3 | 117 | 100 |
| 15 | 5.0 | 128 | 97 |

The results in Table 4 show a decrease in equilibrium torque and final temperature with increasing glass content from 0 percent (Example 12) to 4 percent (Example 15). The maximum temperatures of the materials of Examples 13–15 showed some scatter, but all maximum and final temperatures were reasonably low and the times at $T_{max}$ were relatively short.

As is evident from the above description, certain materials made by embodiments of the present method may be suitable for use as bearing materials. It will be understood, however, that the present invention is not so limited and that certain materials made by the method of the present invention or otherwise within the scope of the present invention may be useful in other applications. Examples of such other applications include gear and cam applications. Whereas particular embodiments of the invention have been described herein for the purpose of illustrating the invention and not for the purpose of limiting the same, it will be appreciated by those of ordinary skill in the art that numerous variations of the details, materials, and arrangement of steps and ingredients may be made within the principle and scope of the invention without departing from the invention as described in the appended claims.

What is claimed is:

1. A method of forming a powder metal bearing material, the method comprising:
    molding a compact from a powder mix comprising an iron-containing powder, a glass, and at least one solid lubricant selected from the group consisting of from about 1 up to about 8.0 weight percent graphite and from 0.6 up to about 6 weight percent molybdenum disulfide; and
    sintering the compact at a temperature no greater than 1750° F.

2. The method of claim 1, wherein the powder mix comprises graphite and molybdenum disulfide.

3. The method of claim 1, wherein the iron-containing powder is at least one powder selected from pure sponge iron powder, a sponge iron alloy powder, an atomized iron powder, and an atomized iron alloy powder.

4. The method of claim 1, wherein the powder mix comprises about 1 up to about 8.0 weight percent graphite.

5. The method of claim 1, wherein the powder mix comprises about 2.0 up to about 6.0 weight percent graphite.

6. The method of claim 1, wherein the powder mix comprises up to about 15 weight percent glass.

7. The method of claim 1, wherein the powder mix comprises about 0.5 up to about 10 weight percent glass.

8. The method of claim 1, wherein the powder mix comprises about 0.5 up to about 5 weight percent glass.

9. The method of claim 1, wherein the glass in the powder mix is particulate glass, substantially all glass particles pass through a 100 mesh screen, and at least 50 percent by weight of glass particles pass through a 325 mesh screen.

10. The method of claim 1, wherein the powder mix comprises at least one phosphate glass.

11. The method of claim 1, wherein the glass in the powder mix has a melting point less than about 1700° F.

12. The method of claim 1, wherein the glass in the powder mix has a melting point less than about 1500° F.

13. The method of claim 1, wherein the powder mix comprises 0.6 up to about 6 weight percent molybdenum disulfide.

14. The method of claim 1, wherein sintering the compact comprises heating the compact in the range of about 1500° F. to about 1750° F.

15. The method of claim 1, wherein molding the compact provides a green compact having 18 to 25 volume percent porosity.

16. The method of claim 1, wherein the sintered compact has internal porosity and the method further comprises, subsequent to sintering the compact:
    impregnating the compact with a liquid lubricant so that the lubricant is provided within pores of the compact.

17. A method of forming a powder metal bearing material, the method comprising:
    molding a compact from a powder mix comprising at least one iron-containing powder selected from pure sponge iron powder, a sponge iron alloy powder, an atomized iron powder, and an atomized iron alloy powder, about 0.5 up to about 15 weight percent particulate glass, and at least one solid lubricant; and
    sintering the compact at a temperature no greater than about 1750° F.

18. The method of claim 17, wherein the at least one solid lubricant comprises at least one of 1 up to 8 weight percent graphite and 0.6 up to 6 weight percent molybdenum disulfide.

19. The method of claim 17, wherein the powder mix comprises at least one phosphate glass.

20. The method of claim 17, wherein sintering the compact comprises heating the compact in the range of about 1500° F. to about 1750° F.

21. The method of claim 17, wherein the sintering temperature is less than about 1500° F.

22. A powder mix useful for producing sintered powder metal material, the powder mix comprising:
    an iron-containing powder;
    particulate glass having a melting point less than about 1700° F.; and
    at least one solid lubricant selected from the group consisting of from about 1 up to about 8.0 weight percent particulate graphite and from 0.6 up to about 6 weight percent particulate molybdenum disulfide.

23. The powder mix of claim 22, comprising particulate graphite and particulate molybdenum disulfide.

24. The powder mix of claim 22, comprising about 1 up to about 8.0 weight percent particulate graphite.

25. The powder mix of claim 22, comprising about 0.5 up to about 15 weight percent glass.

26. The powder mix of claim 22, wherein substantially all glass particles pass through a 100 mesh screen, and at least 50 percent by weight of the glass particles pass through a 325 mesh screen.

27. The powder mix of claim 22, wherein the powder mix comprises at least one phosphate glass.

28. A sintered powder metal bearing material comprising:
   a matrix comprising iron;
   glass; and
   at least one solid lubricant selected from the group consisting of from about 1 up to about 8.0 weight percent graphite and from 0.6 up to about 6 weight percent molybdenum disulfide randomly distributed in the matrix.

29. The sintered powder metal bearing material of claim 28, comprising graphite and molybdenum disulfide.

30. The sintered powder metal bearing material of claim 28, comprising about 1 up to about 8 weight percent graphite and 0.6 up to about 6 weight percent molybdenum disulfide.

31. The sintered powder metal bearing material of claim 28, comprising about 1 up to about 8.0 weight percent graphite.

32. The sintered powder metal bearing material of claim 28, comprising about 2.0 up to about 6.0 weight percent graphite.

33. The sintered powder metal bearing material of claim 28, comprising about 0.5 up to about 15 weight percent glass.

34. The sintered powder metal bearing material of claim 28, comprising about 0.5 up to about 10 weight percent glass.

35. The sintered powder metal bearing material of claim 28, comprising about 0.5 up to about 5 weight percent glass.

36. The sintered powder metal bearing material of claim 28, comprising at least one phosphate glass.

37. The sintered powder metal bearing material of claim 28, wherein the glass has a melting point less than about 1700° F.

38. The sintered powder metal bearing material of claim 28, wherein the glass has a melting point less than about 1500° F.

39. The sintered powder metal bearing material of claim 28, wherein at least a portion of the glass is present in iron grain boundaries of the material.

40. The sintered powder metal bearing material of claim 28, where at least a portion of the glass is present in pores of the material.

41. The sintered powder metal bearing material of claim 28, wherein the material has a lifetime of at least 1000 hours in edge-loaded testing using a PV factor of at least 50,000.

42. The sintered powder metal bearing material of claim 28, wherein the material has a lifetime of at least 1000 hours in edge-loaded testing using a PV factor of at least 100,000.

43. An article of manufacture including a sintered powder metal material comprising a matrix comprising iron, glass, and at least one solid lubricant selected from the group consisting of from about 1 up to about 8.0 weight percent graphite and from 0.6 up to about 6 weight percent molybdenum disulfide randomly distribute in the matrix; wherein the sintered powder metal material is substantially free of hard phases.

44. The article of manufacture of claim 43, wherein the powder metal material comprises graphite and molybdenum disulfide.

45. The article of manufacture of claim 43, wherein the article of manufacture is selected from a bearing, a gear, and a cam.

46. The article of manufacture of claim 43, wherein the powder metal material is in the form of one of a bearing, a gear, and a cam.

47. A powder metal bearing material having a microstructure comprising first regions and second regions, the first regions comprising iron and the second regions comprising glass; and at least one of from about 1 up to about 8.0 weight percent of graphite particles and from 0.6 up to about 6 weight percent of molybdenum disulfide particles randomly distributed in the first regions.

48. The powder metal bearing material of claim 47, wherein graphite particles and molybdenum disulfide particles are randomly distributed in the first regions.

49. The powder metal bearing material of claim 47, wherein the material comprises about 1 up to about 8.0 weight percent of graphite particles randomly distributed in the first regions.

50. The powder metal bearing material of claim 47, wherein the material comprises about 2.0 up to about 6.0 weight percent of graphite particles randomly distributed in the first regions.

51. The powder metal bearing material of claim 47, wherein the material comprises up to about 15 weight percent glass.

52. The powder metal bearing material of claim 47, wherein the material comprises about 0.5 up to about 10 weight percent glass.

53. The powder metal bearing material of claim 47, wherein the material comprises about 0.5 up to about 5 weight percent glass.

54. The powder metal bearing material of claim 47, wherein the material comprises at least one phosphate glass.

55. The powder metal bearing material of claim 47, wherein the material comprises at least one glass having a melting point less than about 1700° F.

56. The powder metal bearing material of claim 47, wherein the material comprises at least one glass having a melting point less than about 1500° F.

57. The powder metal bearing material of claim 47, wherein the material comprises from 0.6 up to about 6 weight percent of molybdenum disulfide particles randomly distributed in the first regions.

58. The powder metal bearing material of claim 47, wherein the material comprises glass in boundaries of iron-containing grains in the material.

59. The powder metal bearing material of claim 47, wherein the material comprises glass in pores in the material.

60. A sintered powder metal material comprising iron, graphite, molybdenum disulfide, and glass having a melting point less than 1700° F., the material including:
   a matrix comprising iron; and
   a random dispersion of particles of at least one solid lubricant in said matrix.

61. The sintered powder metal material of claim 60, wherein the iron is ferritic iron.

62. The sintered powder metal material of claim 60, wherein the solid lubricant is at least one of graphite and molybdenum disulfide.

63. The sintered powder metal material of claim 60, wherein the material comprises about 1 up to about 8.0 weight percent graphite.

64. The sintered powder metal material of claim 60, wherein the material comprises about 2.0 up to about 6.0 weight percent graphite.

65. The sintered powder metal material of claim 60, wherein the material comprises up to about 15 weight percent glass.

66. The sintered powder metal material of claim 60, wherein the material comprises about 0.5 up to about 10 weight percent glass.

67. The sintered powder metal material of claim 60, wherein the material comprises about 0.5 up to about 5 weight percent glass.

68. The sintered powder metal material of claim 60, wherein the material comprises at least one phosphate glass.

69. The sintered powder metal material of claim 60, wherein the material comprises at least one glass having a melting point less than about 1500° F.

70. The sintered powder metal material of claim 60, wherein the material comprises 0.6 up to about 6 weight percent molybdenum disulfide.

Figure 4:
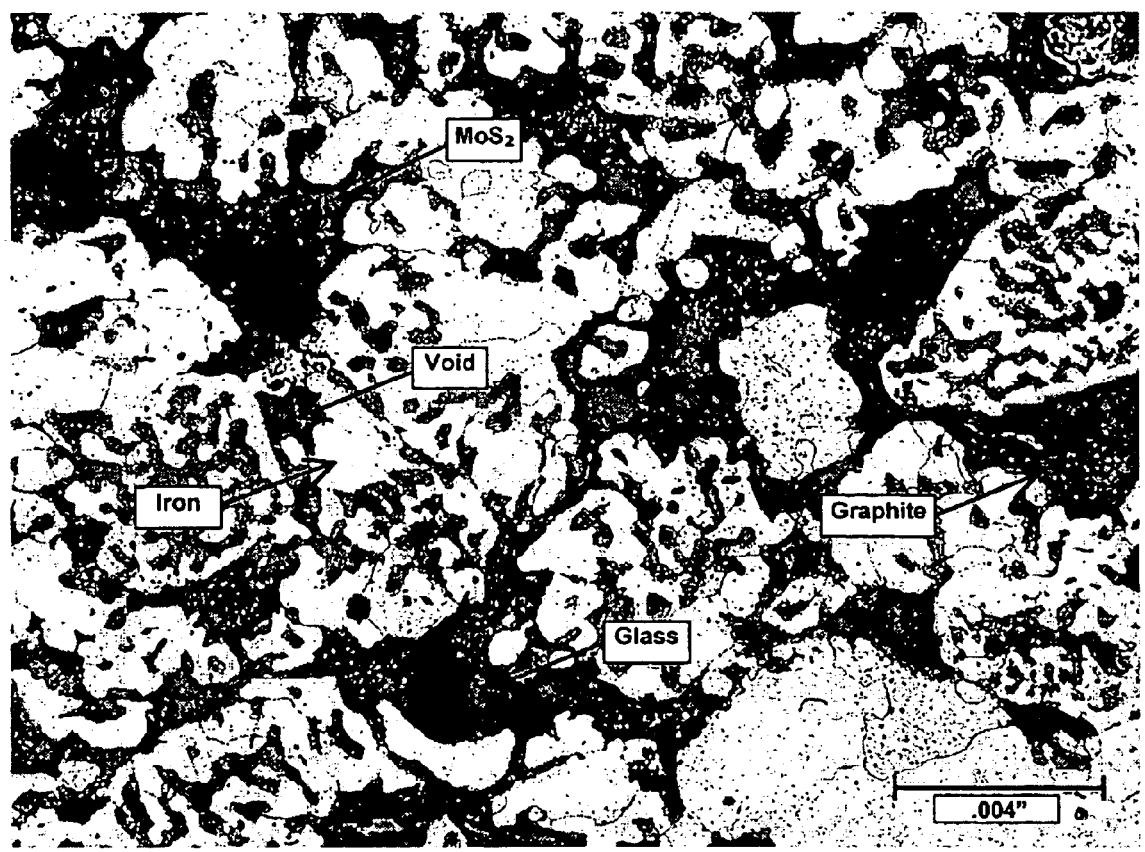
FIG. 4 is a photomicrograph of an iron-containing powder metal material made by an embodiment of the method of the present invention from a powder mix including iron-containing powder, graphite, molybdenum disulfide, and glass.

71. A sintered powder metal bearing material comprising iron, glass, from about 1 to about 8.0 weight percent graphite, and from 0.6 up to about 6 weight percent molybdenum disulfide, and having a microstructure as shown in FIG. 4.

72. A method of forming a powder metal material comprising:
   molding a compact from a powder mix comprising an iron-containing powder, a glass, and at least one solid lubricant selected from about 1 up to about 8.0 weight percent graphite and 0.6 up to about 6 weight percent molybdenum disulfide;
   sintering the compact at a temperature no greater than 1750° F.;
   sizing the compact; and
   impregnating the compact with a liquid lubricant.

73. The method of claim 72 wherein the powder mix comprises graphite and molybdenum disulfide.

74. A method of forming a powder metal material comprising
   molding a compact from a powder mix comprising an iron-containing powder, a glass having a melting point less than 1700° F., at least one solid lubricant chosen from graphite and molybdenum disulfide; and
   sintering the compact at a temperature no greater then 1750° F.

75. The method of claim 74 further comprising sizing the compact after sintering the compact and impregnating the compact with a liquid lubricant after sizing.

76. A method of forming a powder metal material, the method comprising:
   molding a compact from a powder mix comprising an iron-containing powder and glass;
   sintering the compact at a temperature no greater than 1750° F., wherein the sintered compact has internal porosity; and
   impregnating the compact with a liquid lubricant comprising an oil subsequent to sintering the compact such that the liquid lubricant is provided within pores of the sintered compact.

\* \* \* \* \*

UNITED STATES PATENT AND TRADEMARK OFFICE
CERTIFICATE OF CORRECTION

PATENT NO.     : 6,833,018 B1
DATED          : December 21, 2004
INVENTOR(S)    : John C. Kosco It is certified that error appears in the above-identified patent and that said Letters Patent is hereby corrected as shown below:

Title page,
Item [56], References Cited, U.S. PATENT DOCUMENTS,
"3,205,566" reference, replace "Breyton" with -- Breton --.

Column 17,
Line 56, replace "distribute" with -- distributed --.

Signed and Sealed this

Seventh Day of March, 2006

JON W. DUDAS
*Director of the United States Patent and Trademark Office*